United States Patent [19]
Johnson et al.

[11] Patent Number: 5,568,383
[45] Date of Patent: Oct. 22, 1996

[54] NATURAL LANGUAGE TRANSLATION SYSTEM AND DOCUMENT TRANSMISSION NETWORK WITH TRANSLATION LOSS INFORMATION AND RESTRICTIONS

[75] Inventors: William J. Johnson, Flower Mound; Michael D. Smith, Euless; Marvin L. Williams, Lewisville, all of Tex.

[73] Assignee: International Business Machines Corporation, Armonk, N.Y.

[21] Appl. No.: 344,295

[22] Filed: Nov. 23, 1994

Related U.S. Application Data

[63] Continuation of Ser. No. 983,018, Nov. 30, 1992, abandoned.
[51] Int. Cl.$^6$ ................................................ G06F 17/28
[52] U.S. Cl. ................................................ 364/419.02
[58] Field of Search .................... 364/419.02, 419.03, 364/419.04, 419.05, 419.06, 419.07

[56] References Cited

U.S. PATENT DOCUMENTS 4,502,128  2/1985  Okajima et al. ................ 364/419
5,175,684 12/1992  Chong ............................ 364/419

OTHER PUBLICATIONS

*Patent Abstracts of Japan*, vol. 13, No. 322, Apr. 3, 1989, Abstract No. 01–88776, Hasebe et al.

Primary Examiner—Gail O. Hayes
Assistant Examiner—Steven R. Yount
Attorney, Agent, or Firm—Edward H. Duffield

[57] ABSTRACT

A network and methodology provides transmission of documents with accompanying translation loss information. The originator of a document translates the document from a native language into a second language capable of reception by a recipient. Loss information is generated and presented to the originator who inputs loss criteria information restricting and/or enforcing specified translations of the document by the recipient. The loss criteria information may be attached to the original document in the native language of the originator and transmitted to the recipient. The document is translated into the second language recognizable by the user based on the loss criteria information attached to the document.

13 Claims, 7 Drawing Sheets

| English (20) | Russian (22) | English Translation (24) | Information Loss (26) |
|---|---|---|---|
| Bad | Плох | Bad | No |
| High | Толстый | High | No |
| Fat | Высокий | Fat | No |
| Good | Хороший | Fine | Yes |
|  |  |  |  |

| PERMISSABLE TRANSLATIONS | (48) | (50) |
|---|---|---|
| RUSSIAN |  | ↑ 42 |
| KOREAN |  |  |
| AMERICAN ENGLISH |  | ■ 46 |
| GREEK |  |  |
| CHINESE |  |  |
| UNIVERSAL |  | ↓ 44 |

40

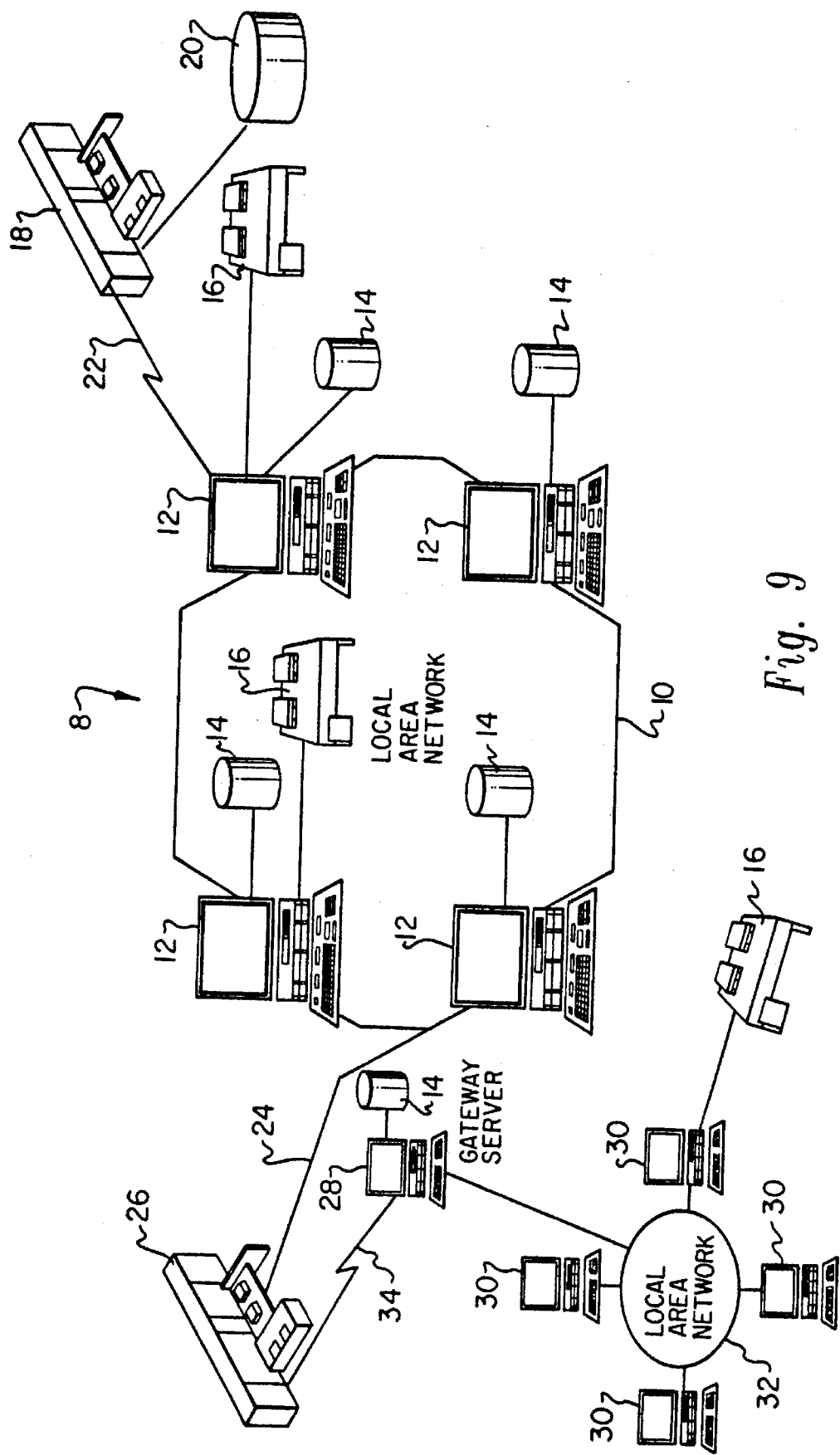

NATURAL LANGUAGE TRANSLATION SYSTEM AND DOCUMENT TRANSMISSION NETWORK WITH TRANSLATION LOSS INFORMATION AND RESTRICTIONS

The application is a continuation of application Ser. No. 07/983,018, filed Nov. 30, 1992, now abandoned.

TECHNICAL FIELD OF THE INVENTION

This invention relates to a method and apparatus for transmitting messages, and more particularly, to the detection and reporting of translation losses to users within a network when audio messages are translated.

BACKGROUND OF THE INVENTION

The proliferation of electronic office systems creates a need for exchanging and storing information. One reason for this proliferation is the popularity of Electronic mail (E-mail) networks. Electronic mail networks permit a network of communicating text and word processors to transmit documents (e.g. text, graphic, facsimile, voice, etc.) from one end-user to another. The current state of the art permits a sender to transmit an audio message to a recipient or embed an audio message or music into documents. This capability allows a network user to personalize documents and communicate using the power of voice or music in sound annotated messages, electronic mail or multimedia presentations. Sound files may be depicted in documents as icons resembling microphones. A user may playback messages using sound enabling hardware or with microphones and speaker devices plugged into a workstation.

Electronic mail networks now permit inter-vendor networking of voice messages between different mail systems thereby increasing the reach of network users. Voice messages may be delivered to a recipient, marked with a time and date stamped. The voice messages may then be delivered immediately, overnight or scheduled for delivery up to one year in advance. Electronic mail networks supporting voice processing may support multiple applications such as voice mail, voice response, fax and electronic mail. As used in this specifications, voice processing is an underlying technology which consists of voice mail, auto attendant, interactive voice response, text-to-speech, audient and speech recognition.

Electronic mail networks enable wide spread user communications encompassing many nationalities. Recipients of voice messages may receive audio messages in a language that is not native to the recipient. While prior art mechanisms have addressed converting a text message to a recipient's native language or one computer machine code to another (e.g., Revisable File Text (RFT) to ASCII), they have not addressed transmission of audio messages and the word translation losses incurred when the audio messages are translated. Word translation losses occur for many reasons but most losses occur due to the dialect of a language. Generally, automatic language translation systems have an accuracy of between 60–80 percent for translating scientific and technical materials. However, translating accuracy suffers substantially when handling conversational sentences with their often obscure grammatical structure. Conversion/Translation of an audio message from an originator's language may produce words that are of a dubious nature in a recipient's native language. Even when words are the closest match that a language translation mechanism can perform, they may still be unacceptable. Another problem surfaces when the originator of an audio message needs to retain a verification copy of the transmitted document. While the originator may keep a copy of the original document, a translated version of the transmitted document is not available making it impossible to verify what the recipient has viewed. Prior art systems have not provided mechanisms that allow originators of audio messages to specify the conditions for which language translation should occur. A translation mechanism should allow a user transmitting a message to edit the original message before transmitting it if words are used which have no direct translation or which are unacceptable in the recipient's language. Also, the recipient of an audio translation may need to determine the acceptability of the translation. A mechanism is needed that notifies the recipient of an audio message that a language translation has occurred with information loss.

Consequently, a technique is needed that detects information loss when a message/document is translated and conveys this loss to the originator of the message as well as the recipient.

SUMMARY OF THE INVENTION

This invention relates to a method and apparatus for detecting the loss of information resulting from translating a message. An apparatus is provided to detect the loss of information caused by translation by accessing information word loss tables. Information word loss is then transmitted to the originator of the message with provisions for specifying criteria under which future language translations can occur. A language conversion criteria object is created and attached to the audio message before transmitting the audio message to the recipient. The language conversion criteria object permits the originator of the message to specify general criteria and detailed criteria under which future translations can occur. The originator of a message is thereby allowed to define characteristics and convey information word loss on a word by word basis.

BRIEF DESCRIPTION OF THE DRAWINGS

FIG. 9 is a block diagram of a data processing system where this invention may be practiced.

DETAILED DESCRIPTION OF THE INVENTION

Figures 1, 2, 3:
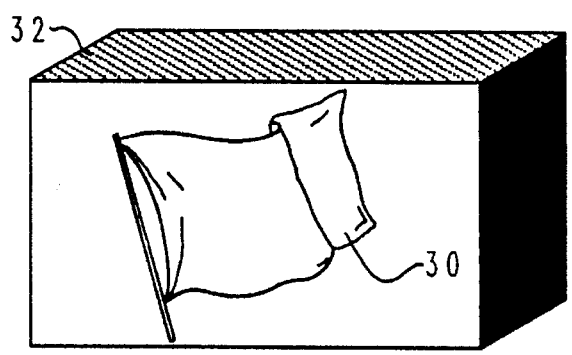
FIG. 1 is a word loss table showing an English to Russian translation.
FIG. 2 shows an icon for a Graphical User Interface (GUI) to call the ward loss table depicted in FIG. 1.
FIG. 3 shows an interactive display panel for a Graphical User Interface allowing selection of one of a plurality of permissible languages into which a message can be translated.

With reference now to the figures, and in particular FIG. 1, there is depicted a word loss table showing a Russian to English translation. The word loss table contains four columns representing Russian 22 words appearing in an audio message, the equivalent English 20 words, the translation of the Russian words to English 24 words, and the information losses 26 resulting from the translation. The table shows that three of the Russian words are successfully translated into English without any information loss. However, the Russian word "XOPOWNN", which has the English equivalent "Good", is translated to "Fine". The information loss 26 column appropriately shows that a translation loss has taken place. Using this technique, information loss may be presented to a user to convey losses resulting from the translation process. In the same way, detailed tables can be accessed to determine how the tense, gender, etc of any language is altered doing the translation process. Of course, one skilled in the art would recognize that alternative embodiments within the scope of this invention could implement various types of information losses similar to those in information loss 26 column such as complete loss, no loss, some loss, etc.

Turning now to FIG. 2, an icon 32 is shown that may be provided within a Graphical User's Interface (GUI) for accessing information loss tables such as the one in FIG. 1. The icon 32 contains a flag 30 thereon indicating to a user the availability of language translation. Selecting the icon with a pointing device (e.g., mouse, light-pen, etc.) or keyboard permits the user to access loss tables or gain access to procedures for specifying criteria for translating messages. FIG. 3 shows how a plurality of permissible language translations are made available to a user through a GUI icon 40. The GUI icon 40 permits user selection of one or more languages for translation. Using a pointing device or keyboard, a user selects one or more languages from the available language translations in column 48. Comprehension is enhanced by providing an image of a flag corresponding to the available translations as shown in column 50. Additional language translations not currently viewable, may be accessed by manipulating the scroll bars 42, 44 and the indicator 46 in conjunction with a pointing device in a manner well known to those skilled in the art.

Figure 4:
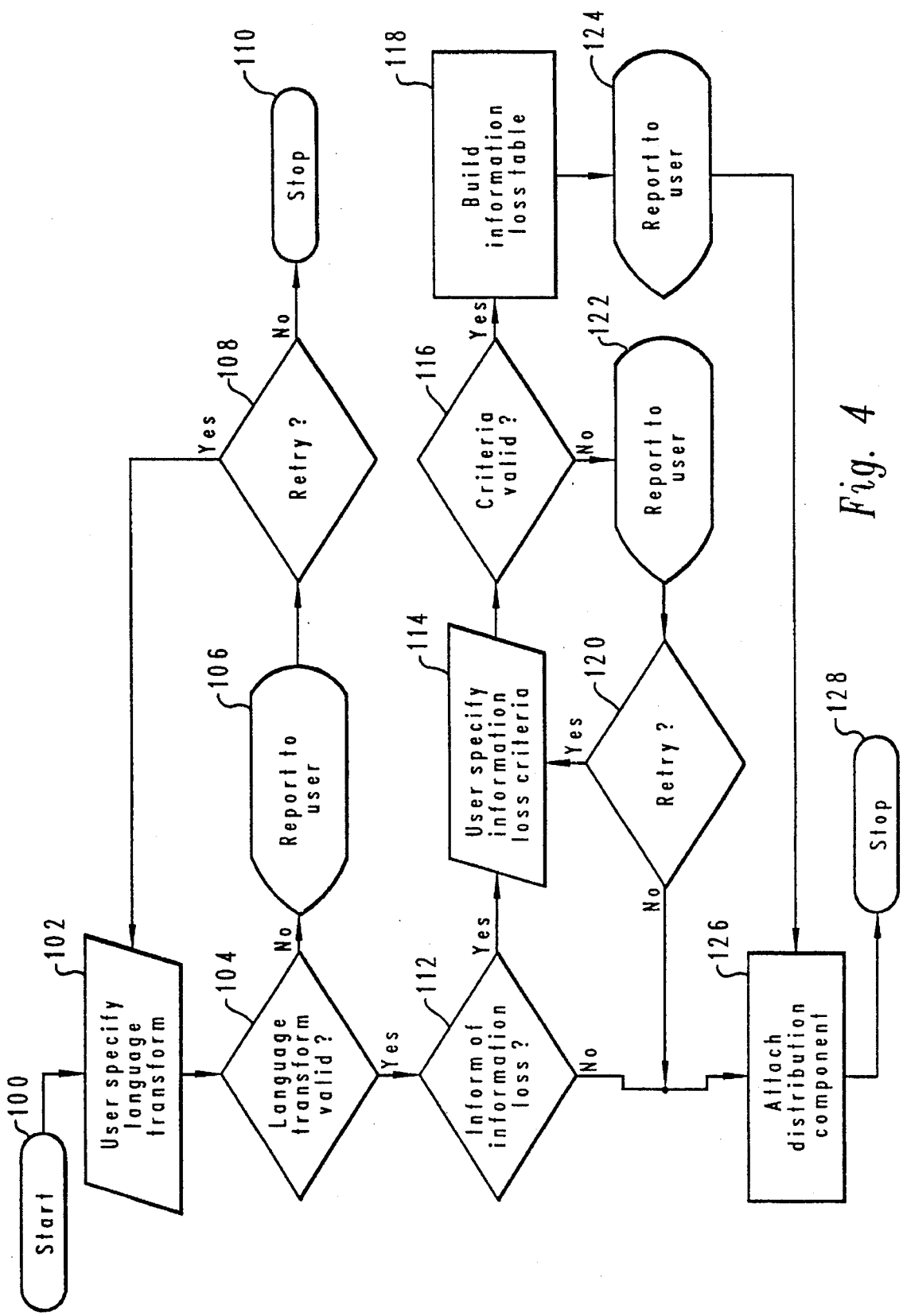
FIG. 4 shows a flow diagram of actions taken when a message is constructed and translated at an Originator's workstation.

Turning now to FIG. 4, a flow diagram is shown describing the operation of the invention when the originator of a note wishes to translate/transform it into another language. The originator of the note specifies a language into which the note will be transformed at block 102. A check is made at block 104 to determine if the mechanism is capable of performing the desired translation. If the translation cannot be performed, an invalid translation is reported to the user at block 106. The user is then permitted to retry or end the process as shown at blocks 108, 102 and block 110. If the translation mechanism determines the language transformation is valid at block 104, control is transferred to block 112 where the user may request notification of information loss. If notification is selected, the user is allowed to enter information loss criteria at block 114. Information losses may be entered as general or detailed criteria. A general criteria may stipulate that if a document is translated from one language to another, then consider the document/message as having information loss. On the other hand, detailed criteria could indicate a particular word has been defined as losing information when translated to a destination language. Thereafter, information loss notification will occur when a message/document is translated to the destination language. For example, the originator of the Russian message shown in FIG. 1, could stipulate that translation of the equivalent English word "Good" would result in information loss. Alternatively, the Russian author could stipulate that the Russian message should not be translated into English. Returning to FIG. 4, the originator is allowed to enter the information loss criteria at block 114 and the loss criteria is checked for validity at block 116. If the loss criteria is valid, an information loss table is built at block 118 and this information is reported to the originator of the note at block 124. The translation mechanism will then attach a distribution component to the original note at block 126 and the process will stop as indicated at block 128. The distribution component will contain information loss table criteria preferably stored in a language conversion criteria (LCC) object that may then be attached to the original message in a manner well known to those skilled in the art and as described in the Document Interchange Architecture (DIA) produced by the IBM Corporation. DIA is a protocol that permits documents to be composed of multiple objects including a document history log object, document relation object, document model object as well as the proposed LCC object. Returning to block 112, if the user elects not to be informed of any information losses, the translation mechanism attaches the distribution component at block 126 without a LCC object and the process ends at block 128. The distribution component contains other document attributes as described in the DIA produced by the IBM Corporation.

Figure 5:
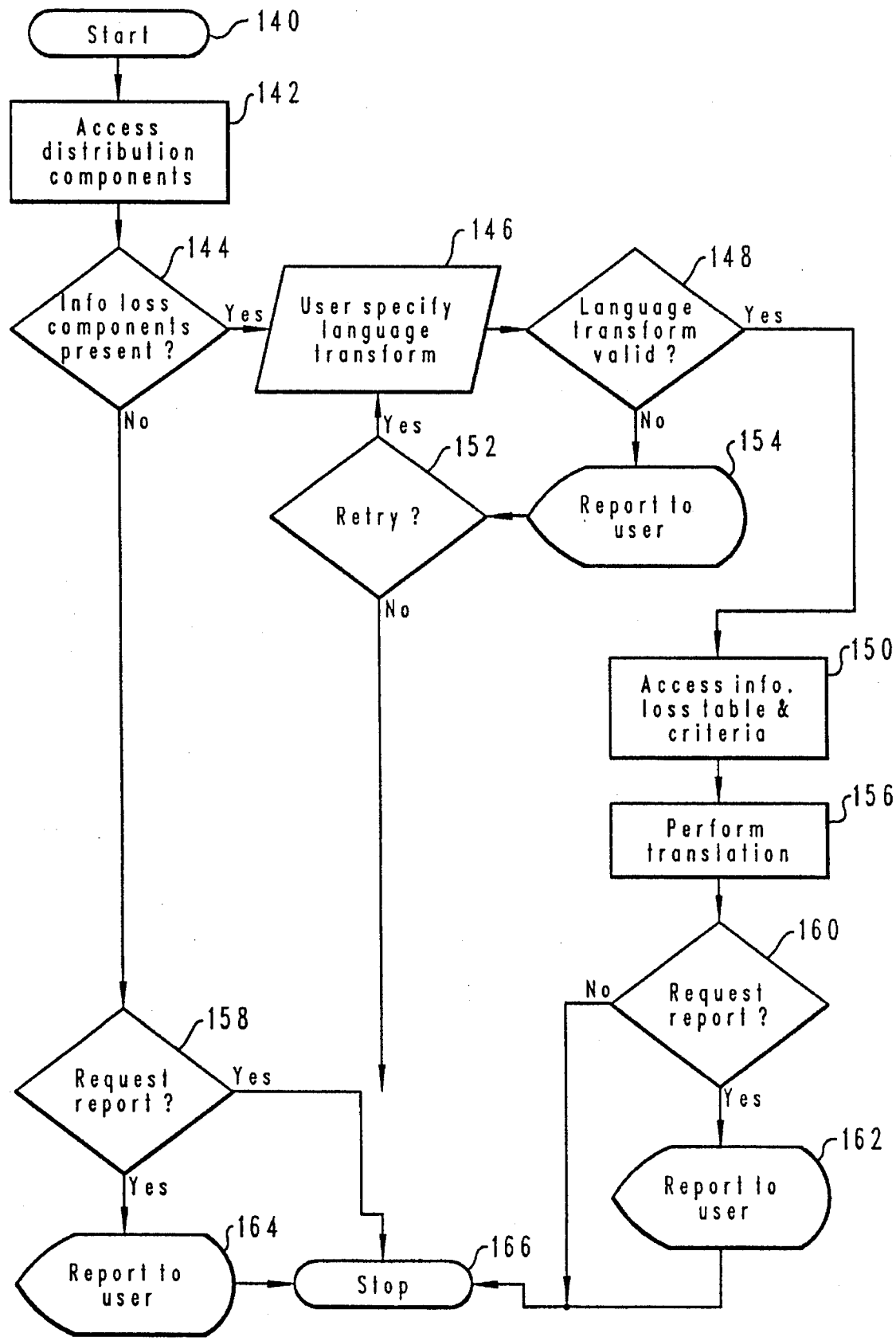
FIG. 5 shows a flow diagram of actions taken when a recipient receives a transmitted message that needs translation at a workstation.

Turning now to FIG. 5, a flow diagram is shown describing the operation of the invention when a message is received at a recipient's workstation. The process begins at block 140 and proceeds to block 142 where the distribution component of the received note is checked for the presence of an information loss component as shown at block 144. If a loss component is attached to the message, the recipient is allowed to select a language transform in block 146. If the selected language transform is valid as shown in block 148, the mechanism accesses the information loss tables and criteria as shown in block 150 and performs the translation as shown in block 156. The recipient of the message may request a report of the translation as shown in block 160 which is sent to the recipient at block 162. The report summaries successes and failures of the translation process with respect to the criteria specified by the originator of the distribution. Returning to block 144, if the translation mechanism determines that an information loss component is not attached to the message, the user may request a report as shown at block 158 containing the information described above. This report is delivered to the user as shown in block 164. Of course, one skilled in the art recognizes that the recipient may be provided the option of requesting a report before or during the reception of the distribution.

Figure 8:
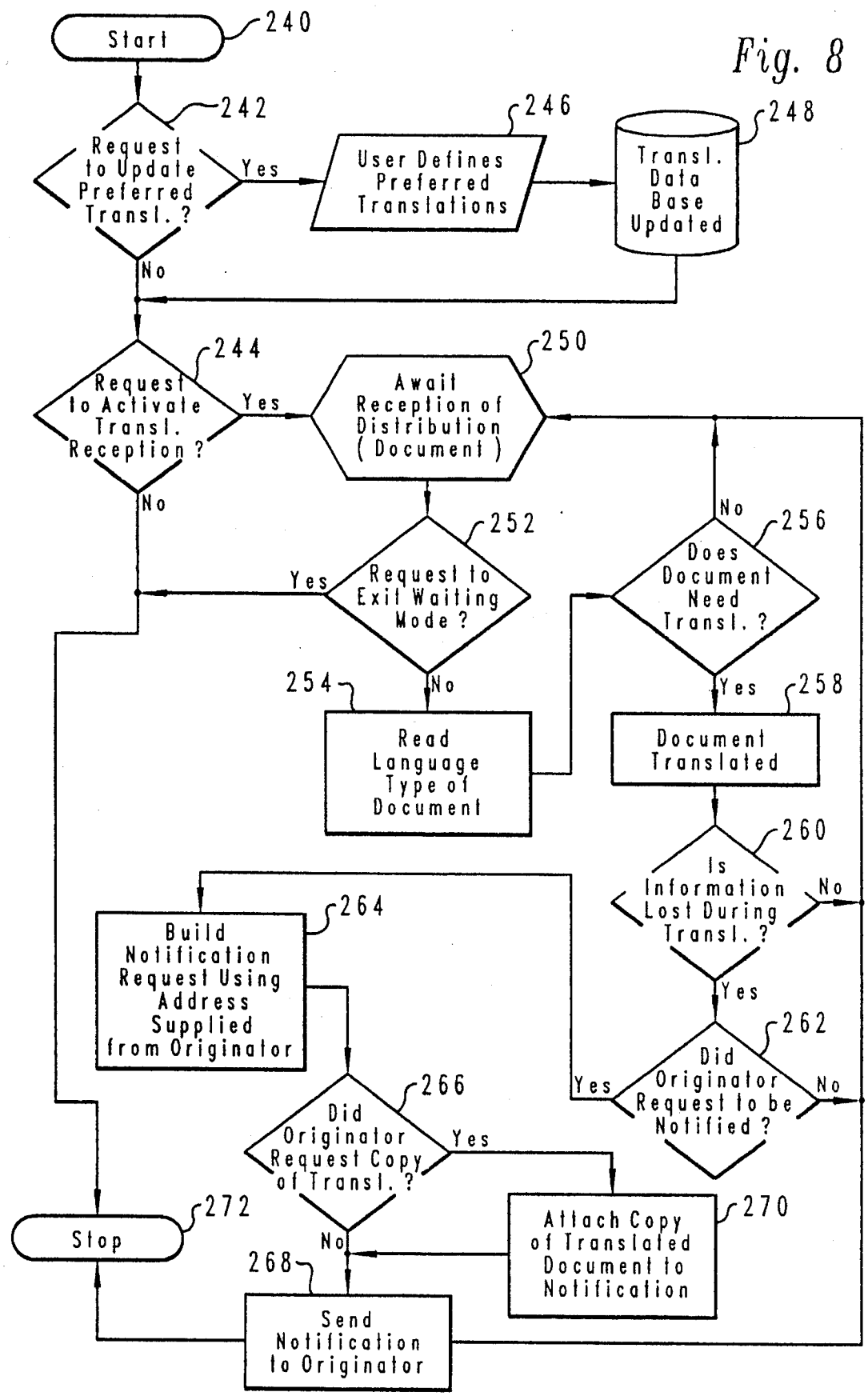
FIG. 8 is a flow diagram of processing undertaken when the originator of a message has requested return notification.

Turning now to FIG. 8, a flow diagram is shown describing additional details of the operation of the invention when the originator has requested notification of message translation by a recipient. At block 242, the recipient is given the option of defining a preferred language translation. For a Russian recipient receiving an English document, the preferred language translation would probably be Russian. Selecting the option to specify a specific language translation allows the user to define a preferred translation as shown at block 246. This causes the translation database at the user's machine to be updated with the preferred translation as shown at block 248 and processing to continue to block 244. Returning to block 242, if the recipient elects not to specify a preferred language translation, control is transferred to block 244 where the user may select activation of the translation reception procedure to receive a transmitted message. Selection of the translation reception procedure results in the initialization and the entry of the receiving workstation into a wait state for receiving the distribution/ message as shown in blocks 250 and 252. When the distribution/document is received, the procedure reads the language type of the document as shown in block 254. At block 256, the user views the document and determines if the document needs translation. The document is translated at block 258 when the user selects the translate option. The translation mechanism determines at block 260 if information loss has occurred as a result of the translation. In addition, at block 262, the translation procedure checks to see if the message originator has requested to be notified of message translations. If the originator of the note has requested notification, the procedure builds the notification request using the address supplied by the originator as shown in block 264. Additional checking is then initiated to determine if the;originator requested a copy of the translation as shown at block 266. At block 270, the procedure attaches a copy of the translated document to the notification and transmits it to the originator as shown in blocks 270 and 268. Using the described steps, the procedure easily handles the translation of messages and returns the status of the translation process to the originators of messages.

Figure 6:
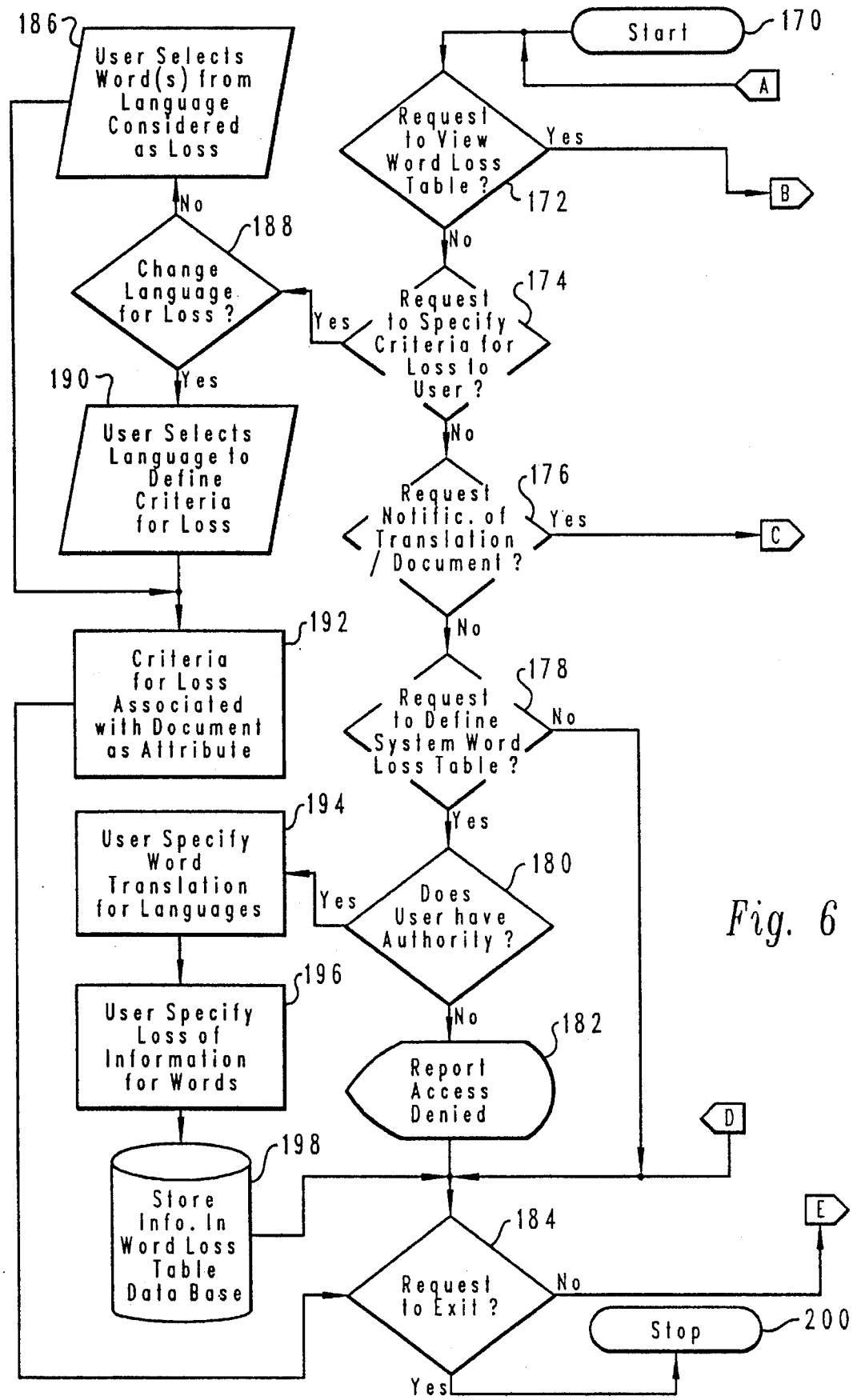
FIGS. 6 and 7 represent the processing done by this invention to develop and present criteria for translating a message.
Figure 7:
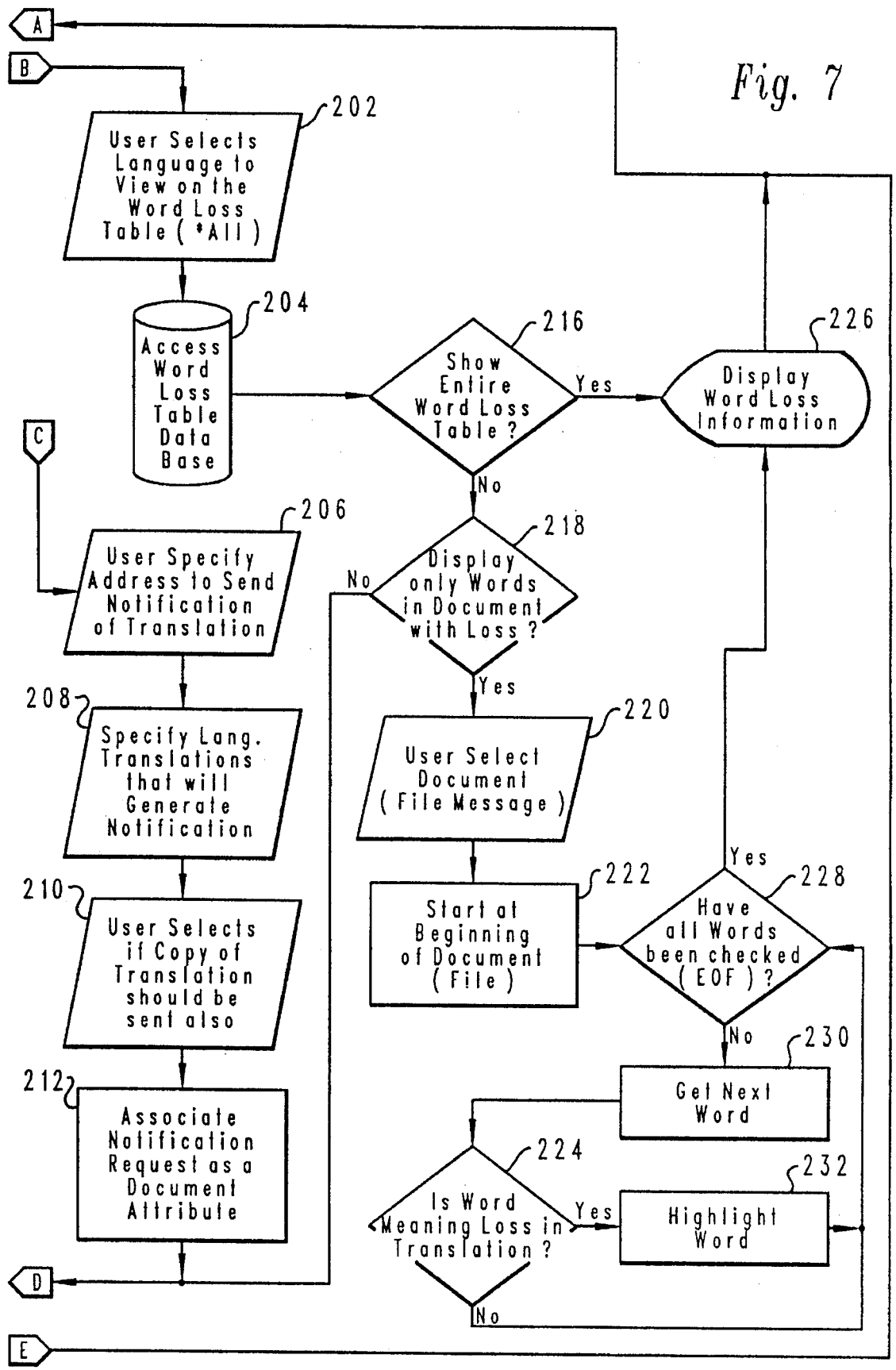

With reference now to FIGS. 6 and 7, there is shown a flowchart in greater detail for creating the criteria for information losses due to audio message translation. To illustrate the operation of the invention where a message is created or received at a user's workstation, the procedure starts at block 170 of FIG. 6. The user through GUI panels similar to those described above, requests a view of the word loss table as indicated at block 172. If a message does not have a word loss table attached to it, the user is allowed to request a display panel to specify criteria for a loss table as shown in block 174. If the message has a word loss table attached, the user selects a language to view the word loss table as shown in block 202 of FIG. 7. This causes the procedure to access a word loss table database as shown at block 204. The user is given the option at block 216 of viewing the entire word loss table or only selected portions. If the entire word loss table is specified, it is presented as shown in block 226. If not, the user at block 218 is given the option of viewing only the words that have experienced losses during translation or terminating the viewing process. If the user elects to terminate the view process, the procedure ends as shown in block 184 of FIG. 6. Else, the user selects a document as shown in FIG. 7 at block 220, and the words that have translation loss information will be sought and detected in the document. At block 222, the procedure starts at the beginning of the document/message and proceeds to check all words experiencing losses due to translation. The procedure loops as indicated at blocks 230, 224, and 232 to completely identify and highlight all words within the messages. The words are then presented to the user as indicated at block 226.

Returning to FIG. 6, the originator of a message may append and send criteria for translation losses along with the audio message. At block 174, a request to send loss criteria option is presented. The user electing not to send criteria for loss along with the message is alternatively given the option of requesting notification of message translation as indicated at block 176. If the user requests notification of the later translation of a message, then the user is allowed to specify the address to send the notification as indicated at block 206 in FIG. 7. At block 208, the user specifies the language translations that will generate a notification message and also indicates whether a copy of the translation should also be sent as shown at block 210. At block 212, a user is allowed to associate the notification request as an attribute to the audio message to be transmitted with the audio message. This attribute will reside in an associated distribution object.

With reference again to FIG. 6 and in particular block 174, if the user elects to specify criteria for loss, then at block 188 an option is given to select the language for translation. This means that the user may select, for example, to change an audio message in English to Russian. At block 190, the user selects the language to define the criteria loss information. The criteria loss information is then associated with the document as an attribute as shown in block 192 and the process ends. Of course, one skilled in the art would recognize that the attribute resides in an associated distribution object. If the user elects not to select a language for defining the criteria loss information, the user may alternatively select words from the language considered to have losses as shown in block 186 and attach this information to the audio message as an attribute as indicated at block 192.

Returning again to block 176, if the user elects not to request notification of the later translation of the audio message, an option is given the user to define a system word loss table in block 178. The procedure ends at block 184 if the user elects not to define a system word loss table. On the other hand, if the user selects definition of a system word loss table, access is checked at block 180 and the user specifies the word translations for languages as shown at block 194. The user specifies loss of information for words in block 196 which is stored in a database at block 198.

Turning now to FIG. 9, there is depicted a pictorial representation of data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Interactive Work Stations (IWS) coupled to a host processor may be utilized for each such network.

As is common 2in such data processing systems, each individual computer may be coupled to a storage device 14 and/or a printer/output device 16. One or more such storage devices 14 may be utilized, in accordance with the method of the present invention, to store applications or resource objects which may be periodically accessed by any user within data processing system 8. In a manner well known in the prior art, each such application or resource object stored within a storage device 14 is associated with a Resource Manager, which is responsible for maintaining and updating all resource objects associated therewith.

Still referring to FIG. 9, it may be seen that data processing network 8 may also include multiple main frame computers, such as main frame computer 18, which may be preferably coupled to Local Area Network (LAN) 10 by means of communications link 22. Main frame computer 18 may also be coupled to a storage device 20 which may serve as remote storage for Local Area Network 10. Similarly, Local Area Network (LAN) 10 may be coupled via communications link 24 through a subsystem control unit/communications controller 26 and communications line 34 to a gateway server 28. Gateway server 28 is preferably an individual computer or Interactive Work Stations (IWS) which serves to link Local Area Network (LAN) 32 to Local Area Network (LAN) 10.

As discussed above with respect to Local Area Network (LAN) 32 and Local Area Network (LAN) 10, resource objects may be stored within storage device 20 and controlled by main frame computer 18, as resource manager for the resource objects thus stored. Of course, those skilled in the art will appreciate that main frame computer 18 may be located a great geographic distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and main frame computer 18 may be located in New York. Those skilled in the art will recognize that a plurality of data processing systems 8 may be coupled together to provide wide area communication to users of different nationalities.

In summary, the invention provides a method and apparatus for transmitting messages and word translation losses incurred when messages are translated and reporting it to users within a network. The originator of the message is allowed to access word loss information tables through a graphical user interface to determine the effects of a particular language translation. The originator of the messages is then allowed to enter general and detailed criteria for future translation of the message in a language conversion criteria object. The language conversion criteria may be subsequently attached to the original message and transmitted to another user within a network. Upon receiving a message from another user which needs translation, the recipient of the message is allowed to access the language conversion criteria object and translate the message. The invention then provides for transmittal of a notification of translation back to the originator. In addition, a copy of the translated message viewed by the recipient may be transmitted to the originator for verification purposes.

While the invention has been particularly shown and described with reference to preferred embodiments thereof, it will be understood by those skilled in the art that various changes in form and details may be made therein without departing from the spirit and scope of the invention.

What I claim is:

1. A computer implemented method of transmitting a document in a data processing system having a plurality of workstations from an originator to a recipient, comprising:

creating said document in a first workstation of said originator in a first language;

translating said document from said first language into a second language at said first workstation and generating information loss for said document accessible by said originator;

specifying loss criteria restricting a particular one of a plurality of translations by said originator based on said information loss and combining said loss criteria with said document in said first language; and transmitting said document in said first language with said loss criteria to said recipient at a second workstation in said data processing system for translation into said second language selected by said recipient based on said loss criteria when said second language is not the particular one of said plurality of translations restricted by said originator.

2. The method of claim 1 wherein said step of translating said document from said first language into a second language at said first workstation includes creating word loss information tables in said first workstation defining attributes of said second language.

3. The method of claim 1 wherein said specifying step includes the steps comprising, creating an object for storing said loss criteria at said first workstation; and entering said loss criteria in said object in a general criteria format at said first workstation.

4. The method of claim 3 wherein said loss criteria is in a detailed criteria format.

5. A computer implemented method of transmitting a document in a data processing system according to claim 1 wherein said transmitting step includes the steps of:

receiving said document in said first language by said recipient in said second workstation;

examining said loss criteria at said second workstation and prohibiting the translation of said document into said second language selected by said recipient based on said loss criteria; and displaying the permissible translations of said document based on the information loss for said document to said recipient at said second workstation.

6. A computer implemented method of transmitting a document in a data processing system according to claim 5 wherein said examining step includes the step of transmitting the translation of said document to said originator.

7. A network including a plurality of workstations and interconnected data processing means for transmitting a document from an originator to a recipient, comprising:

means for creating said document in a first workstation of said originator in a first language;

means for translating said document from said first language into a second language at said first workstation and generating information loss for said document accessible by said originator;

means for specifying loss criteria restricting a particular one of a plurality of translations by said originator based on said information loss and combining said loss criteria with said document in said first language; and means for transmitting said document in said first language and said loss criteria to said recipient at a second workstation in said data processing system for translation into said second language selected by said recipient based on said loss criteria when said second language is not the particular one of said plurality of translations restricted by said originator.

8. A network as recited in claim 7, wherein said means for translating said document from said first language into a second language at said first workstation includes means for creating word loss information tables in said first workstation defining attributes of said second language.

9. The network as recited in claim 7, wherein said means for specifying includes, means for creating an object for storing said loss criteria at said first workstation; and means for entering said loss criteria in said object in a general criteria format at said first workstation.

10. The network of claim 9 wherein said loss criteria is in a detailed criteria format.

11. The network of claim 10 wherein said means for transmitting includes, means for receiving said document in said first language by said recipient into said second workstation;

means for examining said loss criteria at said second workstation and prohibiting the translation of said document into said second language selected by said recipient based on said loss criteria; and means for displaying a permissible translation of said document based on the information loss for said document to said recipient at said second workstation.

12. A computer implemented method of transmitting a document in a data processing system according to claim 1 wherein said transmitting step includes the step of:

transmitting said document in said first language with said loss criteria by said recipient at said second workstation in said data processing system to a second recipient for translation into a third language selected by said second recipient based on said loss criteria when said third language is not the particular one of said plurality of translations restricted by said originator.

13. The network of claim 7 wherein said means for transmitting a document in a data processing system includes, means for transmitting said document in said first language with said loss criteria by said recipient at said second workstation in said data processing system to a second recipient for translation into a third language selected by said second recipient based on said loss criteria when said third language is not the particular one of said plurality of translations restricted by said originator.

* * * * *